(12) United States Patent
Kelada

(10) Patent No.: US 6,245,228 B1
(45) Date of Patent: Jun. 12, 2001

(54) EMERGENCY WATER TREATMENT DEVICE

(76) Inventor: Maher I. Kelada, 1301 Edgewater, Friendswood, TX (US) 77546

( * ) Notice: Subject to any disclaimer, the term of this patent is extended or adjusted under 35 U.S.C. 154(b) by 0 days.

(21) Appl. No.: 09/514,206

(22) Filed: Feb. 28, 2000

(51) Int. Cl.$^7$ ................................................ B01D 27/00
(52) U.S. Cl. .......................... 210/206; 210/232; 210/251; 210/255; 210/257.1; 210/259; 210/287; 210/435; 210/437; 210/464; 210/473
(58) Field of Search .................................. 210/206, 232, 210/251, 255, 257.1, 259, 287, 435, 437, 441, 464, 473

(56) References Cited

U.S. PATENT DOCUMENTS 5,122,272  6/1992  Iana et al. .

Primary Examiner—David A. Simmons
Assistant Examiner—Betsey Morrison Hoey

(57) ABSTRACT

A water treatment device for purifying small quantities of non-potable water for drinking purposes. The device includes: a primary container, a secondary product container, and a cylindrical filter cartridge. The primary container is filled with untreated water, and brought into contact with a disinfecting agent. The filter cartridge is then attached to the primary container and the secondary container is attached to an outlet port of the filter cartridge, the entire arrangement is then inverted to allow water to flow from the primary container into the inlet port of the filter cartridge. A physicochemical time switch is installed near the inlet port of the filter cartridge and blocks the flow of water from the primary container into the filtering elements until an appropriate amount of time has lapsed for the disinfecting agent to effectively disinfect the water. The physicochemical time switch is either a water dissolvable barrier or an expandable compartment filled with hydrophilic polymeric crystals. The filter cartridge includes anion exchange resins, filtering media for removing suspended impurities, and activated carbon for removing organic impurities and chlorine residue.

16 Claims, 12 Drawing Sheets

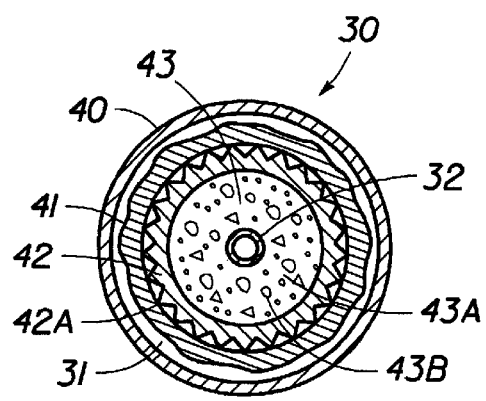
FIG. 3
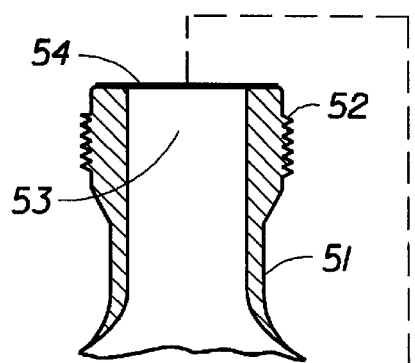
FIG. 4
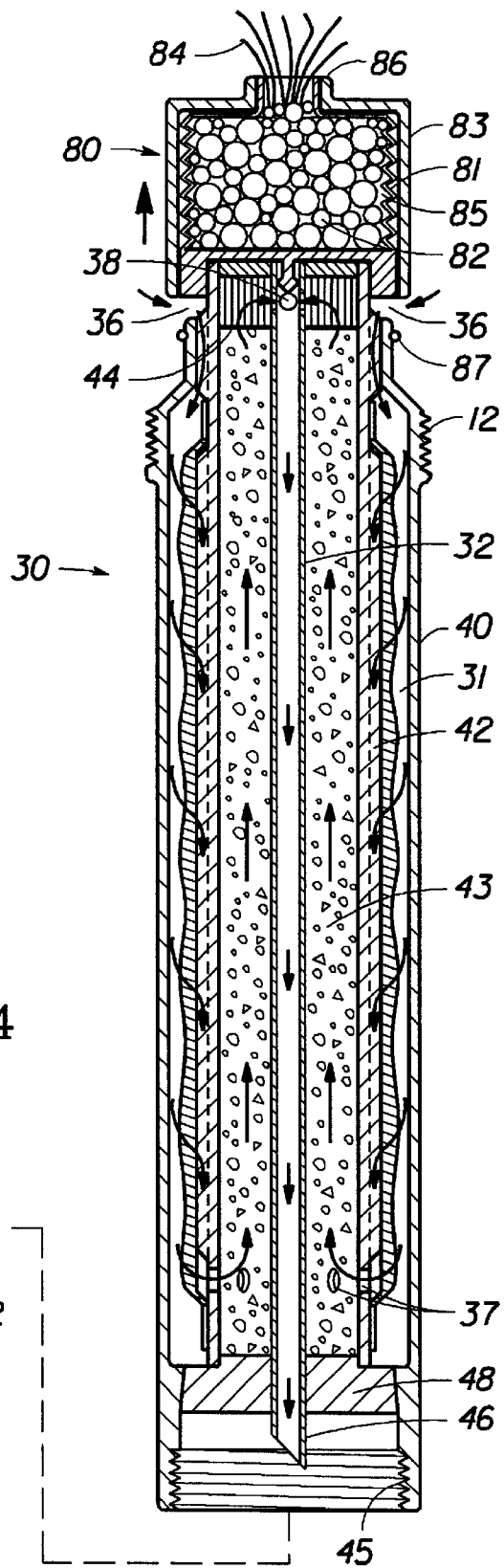

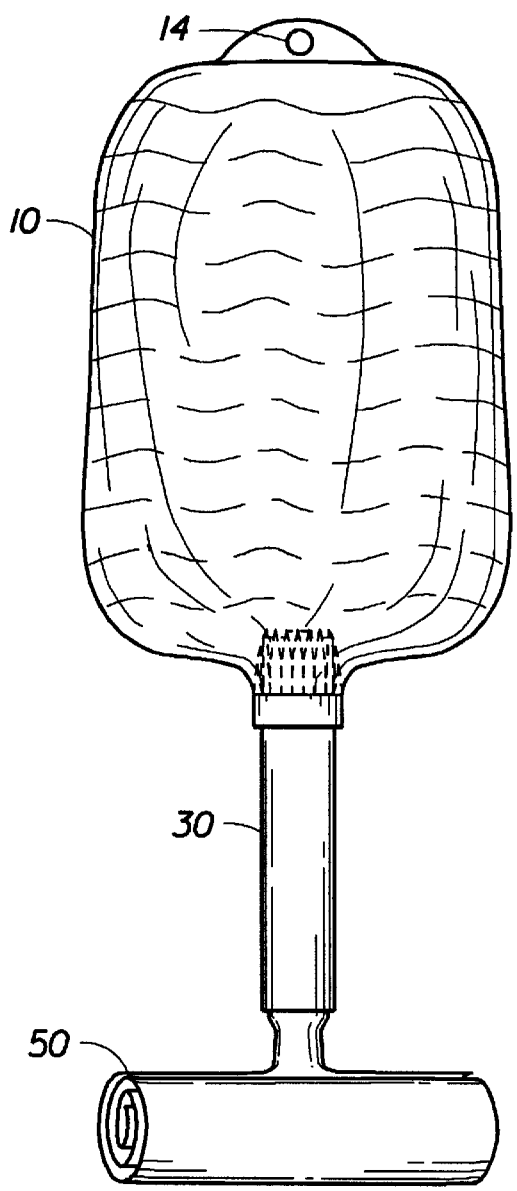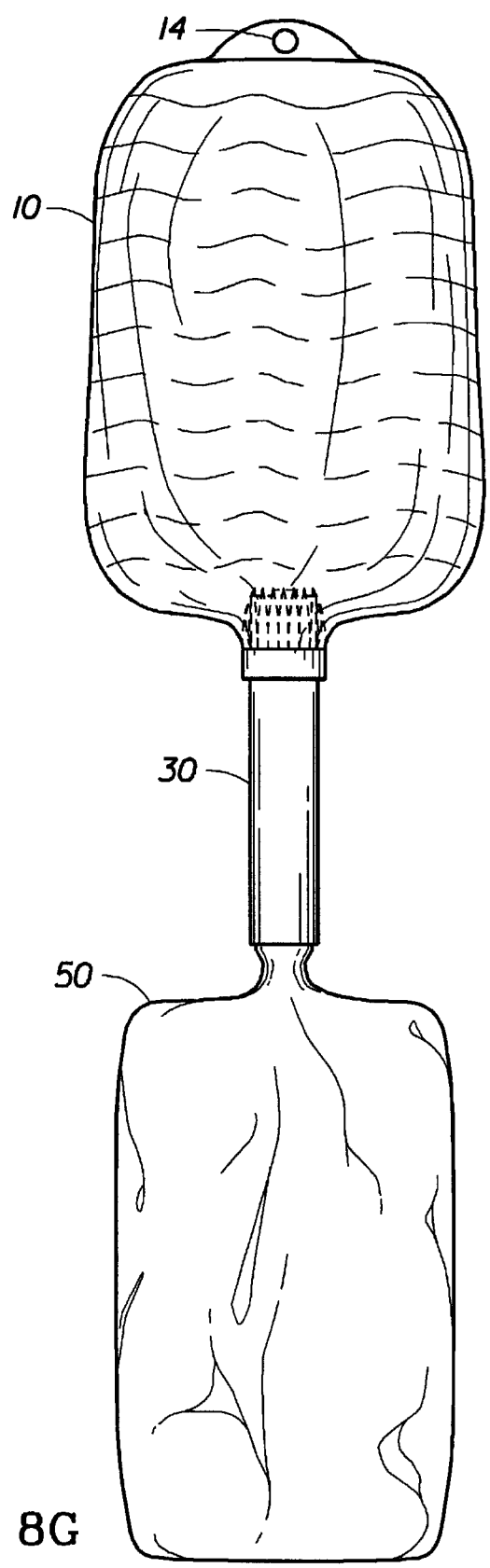
FIG. 8F
FIG. 8G

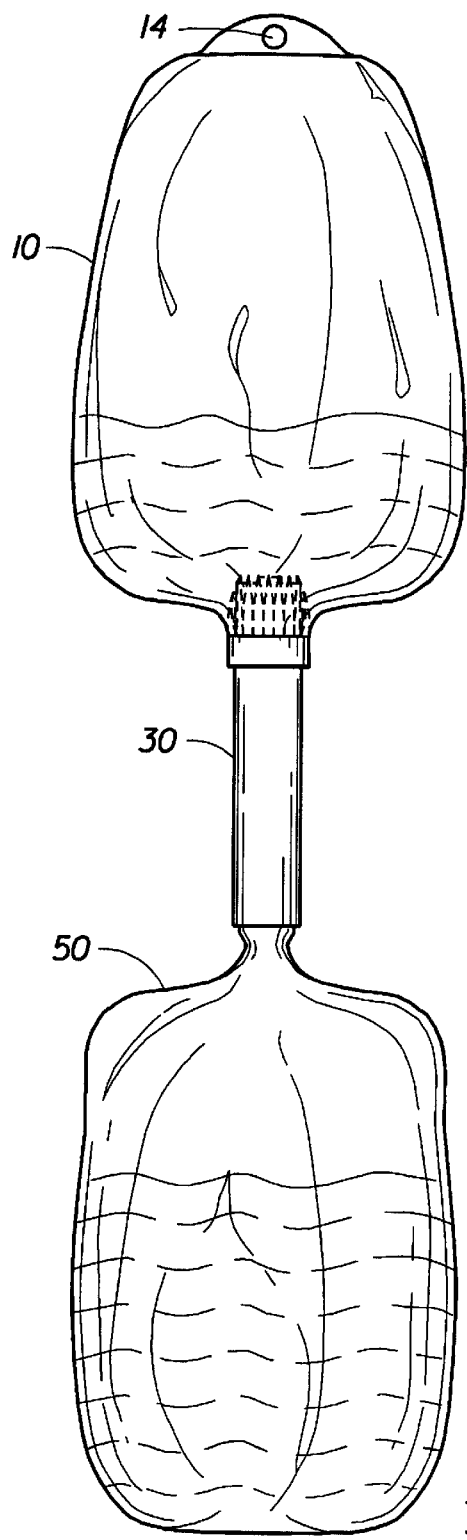
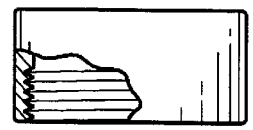
FIG. 8I
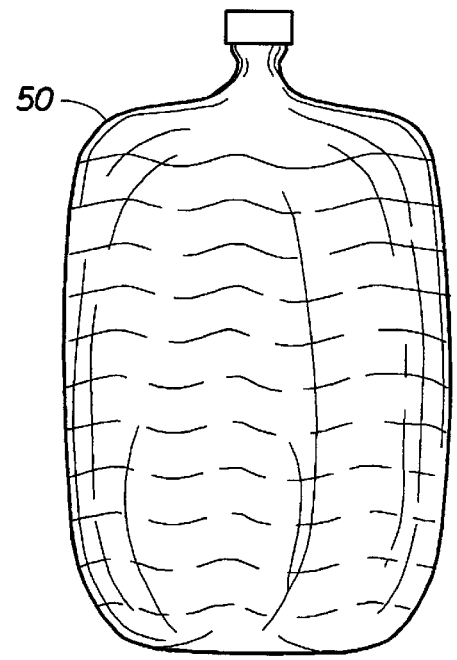
FIG. 8J
FIG. 8H

EMERGENCY WATER TREATMENT DEVICE

TECHNICAL FIELD

The present invention relates to devices and methods for water purification for human consumption and more particularly to devices and methods for a portable, single-use disposable system for disinfecting and filtering water of substandard quality to produce potable water.

BACKGROUND ART

The most important step in purifying water is a complete disinfection of the water prior to filtering. Often, complete disinfection is not accomplished because either the process is interrupted prior to completion or insufficient disinfecting agent is introduced to the water. The present invention overcomes these problems by providing an automatically controlled disinfecting period prior to filtering, while also including a disinfecting agent introduced in a primary container. The duration of the disinfecting period is controlled by a physicochemical time control switch contained within a compact, disposable, multi-stage filter cartridge positioned between a primary water container for untreated water and a secondary container, which receives purified water. Prior art devices either do not provide a disinfecting step, do not include a timed disinfecting step, and/or do not include a primary treatment water container pre-charged with disinfecting agent. With the present invention, after the disinfecting step is complete, a physicochemical time switch located within a filter cartridge allows the flow of disinfected water from the primary water container into the filtering elements of the filter cartridge after an appropriate amount of time has lapsed for effective disinfecting. The present system assures that the water will be properly disinfected for an appropriate time period prior to filtering and purifying.

Prior art devices include: Iana et al, U.S. Pat. No. 5,122,272 which describes a water purifier container with a filter element extending into the neck of the container with a sipping tube extending from a lower chamber of the filter while water within the container enters the filter into an upper chamber. The Iana patent also describes numerous prior art devices, the U.S. Pat Nos. being: 4,852,781; 4,741,550; 4,443,336; 4,298,475; 4,090,650; 3,731,717; 3,389,803; and 2,738,105.

GENERAL SUMMARY DISCUSSION OF INVENTION

This is a relatively simple and inexpensive device for treating surface and storm water in case of emergency, or natural disasters which disrupt the availability of potable water such as during a hurricane, earthquake, civil unrest, camping, and in locations where sanitary water is unavailable. The device uses two disposable containers, preferably flexible wall plastic bags, connected by a cylindrical filter cartridge all of which are single use for treating a limited amount of water, about 1 gallon or less. Untreated water is filled in a primary container, which is charged with a predetermined amount of disinfecting substance that releases chlorine upon contact with the water and which ultimately disinfects the water. An inlet port of the filter cartridge is attached to the opening of the primary container while a secondary product container is attached to the outlet port of the filter cartridge. After filling the primary container with untreated water, the system is turned upside down to allow the water to seep by gravity through the filter cartridge from the primary container to the product container. The device can be hand carried or preferably hung from any suitable projected support member such as a nail from a wall, a door knob or a tree limb. A physicochemical time control switch, described thereafter, is contained within the filter cartridge to provide a set disinfecting exposure period for the pre-treated water with the disinfecting agent in the primary container before water is allowed to flow through the filtering elements of the filter cartridge. The filtering stages of the filter cartridge include various filtering elements such as pre and post sediment removal fiber mesh, activated charcoal, and ion exchange resins for assuring the water is completely purified. The disinfecting exposure period assures that the water is thoroughly disinfected prior to further filtering, the exposure time is about twenty to twenty five minutes. The physicochemical time control switch includes a water passageway extending from a inlet port to the filtering elements, wherein the passageway is blocked by either a water dissolvable barrier which eventually dissolves upon contact with water allowing water to enter and flow through the filtering elements of the cartridge or an expandable compartment which opens the passageway when exposed to water for a sufficient period of time wherein the expandable compartment includes a hydrophillic compound contained therein. The dissolvable barrier dissolve time, or the expansion period of the expandable compartment, is timed to coincide with the period necessary for thorough disinfection of the water prior to further filtering. The device is packaged preferably in groups of two or more so that they are easily carried while traveling, which makes the device particularly suitable for military personnel, business travels who travel to regions without treated water supplies and the like. The device may be scaled up to accommodate larger volumes such as three to five gallons.

It is thus an object of the invention to provide an emergency water treatment device that can be easily carried on a person and used for disinfecting, filtering, and removing nitrate and heavy metals from a small quantity of non-potable water when these water sources are necessary for survival.

It is a further object of the invention to provide an emergency water treatment device that is non-powered, self-contained, very compact, easy to use, disposable, includes a primary water container pre-charged with disinfecting agent for disinfecting the untreated water, includes numerous filtering stages contained within a single filter cartridge, and includes a physicochemical time switch which times a disinfecting step to assure that substandard quality water is fully disinfected prior to filtering so that a more hygienically and aesthetically acceptable water quality is produced.

It is a still further object of the invention to provide an emergency water treatment device that provides a means for disinfecting non-potable water by exposing the water to a disinfecting agent, particularly chlorine in the form of effervescent grade calcium hypochlorite tablets, powder or granules, at a chlorine concentration up to 20 parts per million to disinfect parasites, bacteria and other biological contaminants for a pre-determined disinfecting period of no less than 20 minutes to assure the disinfection of the untreated water is complete prior to filtering.

It is a still further object of the invention to provide an emergency water treatment device that includes a multistage water filter cartridge comprising a filter media to remove suspended material, activated charcoal to remove organic matter and chlorine residual after chlorine disinfecting, and an ion exchange resin to remove heavy metals and virtually eliminate nitrates, which are commonly observed in high concentration in runoff surface water from farm lands and failing septic systems due to storms and floods. The final stage of the said device is a fine fiber filter for trapping particulate matter.

It is a still further object of the invention to provide an emergency water treatment device that includes a non-powered, self-contained, multistage water filter cartridge modified to remove specific water contaminant or suitable for specific application. For example, the said filter cartridge could be easily used as a primary treatment module, followed by a mixed cation and anion ion exchange bed of comparable configuration to eliminate or reduce water salinity when brackish or sea water is the only source of water supply.

It is a further object of the present invention to provide an emergency water treatment device that includes a cylindrical water filter cartridge with an inlet port and an outlet port, where a primary container with disinfecting agent charged therein is filled with untreated water and installed on the inlet port of the filter and a secondary product container is placed on the outlet port of the filter. The device is then turned up so that water flows from the primary container into the filter cartridge. A non-powered physicochemical time switch is installed in the filter cartridge which prevents the flow of water into the filtering elements of the filter cartridge until an appropriate period of time has lapsed thereby providing for complete disinfection in the primary container prior to the water entering the filter cartridge. After the disinfecting period has lapsed and physicochemical time switch has opened, water is allowed to flow by gravity through the filter cartridge and the filtering elements into the secondary product container ready for use.

It is a further object of the present invention to provide an emergency water treatment device which includes a non-powered physicochemical time switch which controls the flow of water through a water passageway from a primary water container into the filtering components of a filter cartridge wherein the physicochemical time switch may include either a water dissolvable barrier or expanding compartment containing hydrophilic compounds, either of which is mounted within the filter cartridge and which blocks water passage from an inlet port of the filter cartridge to filtering elements of the filter cartridge until a disinfecting period has lapsed. The water dissolvable barrier is composed of either a gel membrane, film or disc which starts to dissolve upon contact with water and eventually breakups and allows water to freely flow into the filtering components of the filter cartridge. The expandable compartment used to open the water passageway includes hydrophilic compounds or polyacrylamide and/or other expandable water absorbers contained therein which cause the expandable compartment to distort when the hydrophilic compounds are hydrated and open the water passageway. Capillary fibers extend from an interior of the expandable compartment to an inlet port of the filter cartridge and provide a means for transporting water from the primary container into contact with the hydrophilic compounds contained within the expandable compartment so that after a given period of time, coinciding with an appropriate disinfecting time period, the expandable compartment moves thereby opening the water passageway and allowing disinfected water to flow through the passageway and enter the filtering elements of the filter cartridge.

It is a further object of the present invention to provide an emergency water treatment device which includes a physicochemical non-powered time switch which controls the flow of water from a primary water container into a filter cartridge wherein the time switch includes a water dissolvable barrier positioned to block the passage of water from an inlet port of the filter cartridge through a water passageway to filtering elements of the filter cartridge. The water dissolvable barrier is dissolved by contact with water in the primary container when it is inverted. The water dissolvable barrier is composed of non-hazardous materials shaped in the form of either a film, disc, or membrane. When exposed to water the barrier starts to dissolve and eventually, over time coinciding with the disinfecting period, breaks up and allows water to flow freely through the passageway from the primary container into the filtering elements of the filter cartridge. The dissolvable barrier may be composed of crystalline sugars or salts, or preferably a gel membrane or film composed of pectin or particularly of gelatin.

Accordingly, an emergency water treatment device is provided which is particularly useful for travel and suitable for purifying small quantities of non-potable water for drinking purposes. The device includes two containers, primary and secondary, and a cylindrical filter cartridge. The containers are preferably be flexible, easy to fold or roll plastic bags and may either be attachable to either end of the filter cartridge or each with a specific neck dimension corresponding with either the inlet or outlet of the filter cartridge. A primary container is filled with untreated water, a disinfecting agent is brought into contact with the water therein by either adding the agent or providing the disinfecting agent as pre-charged within the primary container prior to use. The filter cartridge inlet port end is then attached to the primary container and the secondary product container, which is maintained in its folded or rolled-up packaged form, is attached to an outlet port of the filter cartridge, the primary container with the attached filter cartridge and secondary container is then inverted to allow water to flow into the inlet port of the filter cartridge. A physicochemical non-powered time switch is installed near the inlet port of the filter cartridge and blocks the flow of water from the primary container into the filtering elements until an appropriate amount of time has lapsed for the disinfecting agent to effectively disinfect the water, about twenty to about twenty five minutes. The physicochemical time switch may either be a water dissolvable barrier or an expandable compartment filled with hydrophillic polymeric crystals as described above and herein.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is a cross section of the filter cartridge taken along line A—A of FIG. 1.

FIG. 4 is a longitudinal cross section of the filter cartridge fitted with the physicochemical time valve with a expandable compound filled compartment which opens a passage way from primary container into the filter elements of the filter cartridge with the valve in an open position.

FIG. 5a is an exploded view of the filter element with the physicochemical valve with expandable compartment components.

FIG. 5b is a filter sleeve for containing the filter element illustrated in FIG. 5a.

FIGS. 8a–j are illustrations of the various steps for using the device, including filling the primary bag with untreated water (8a–c), installing the filter cartridge (8d), installing the secondary bag (8e), inverting the device and hanging it from a support (8f), the disinfecting waiting step (8g), filtering the water (8h), removing and discarding the primary bag and filter cartridge, and installing a cap on the secondary bag filled with purified water (8i–j).

EXEMPLARY MODE FOR CARRYING OUT THE INVENTION

Figure 1:
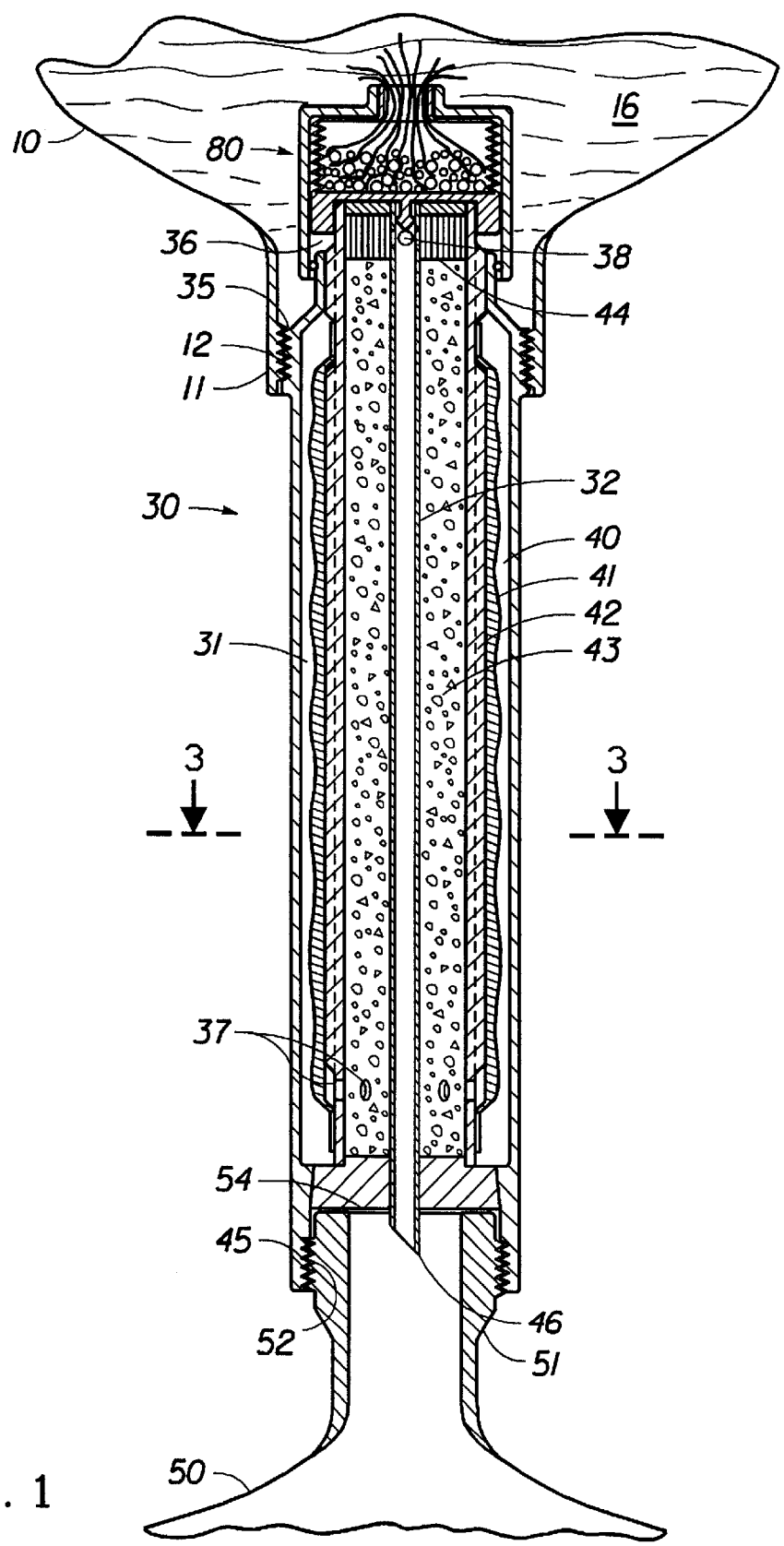
FIG. 1 is a longitudinal cross section view of the device including the primary container, filter cartridge and attached secondary product container.
Figures 2A, 2B:
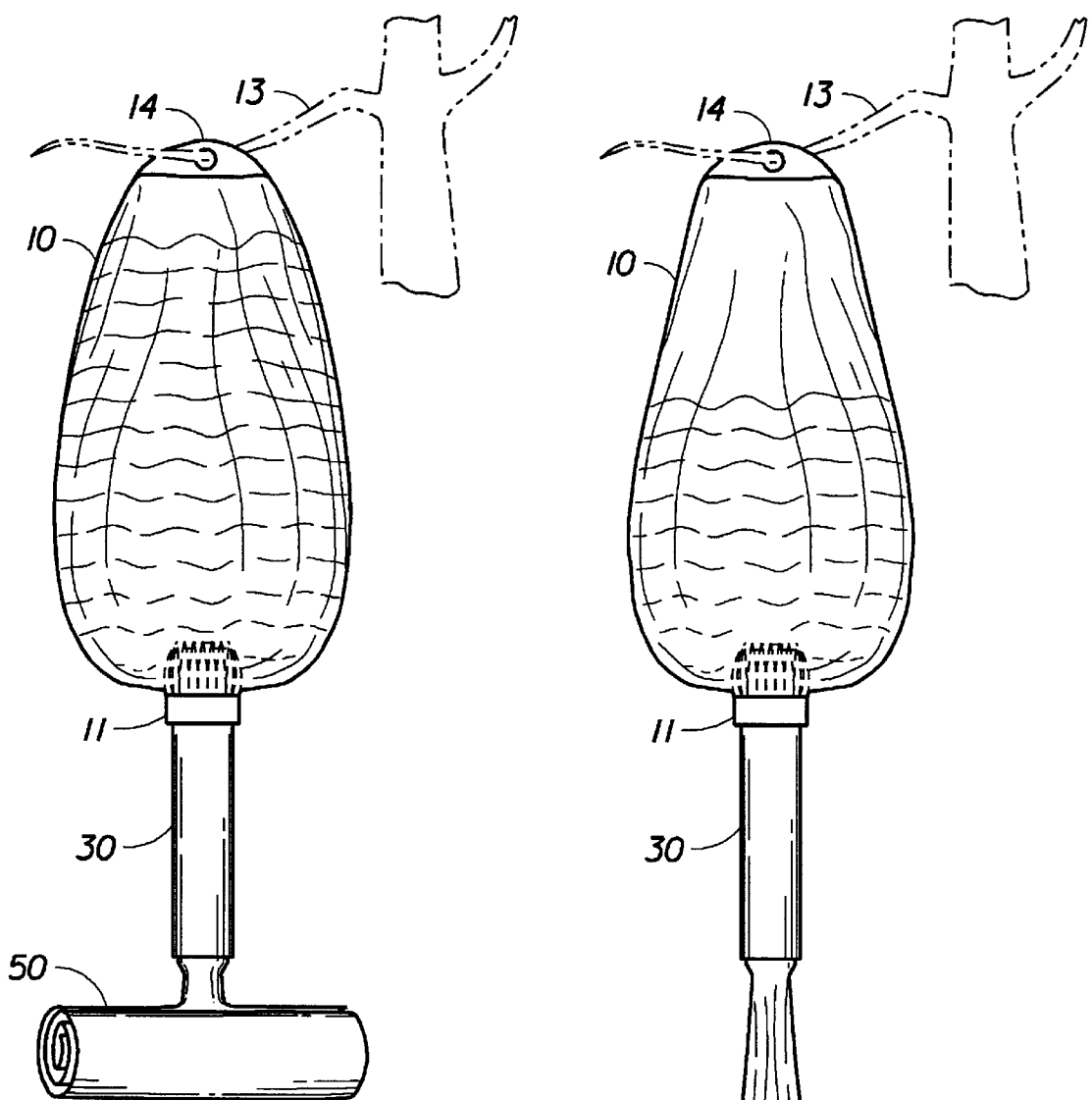
FIG. 2a is a side view of the device hanging from a support with the primary container filled with untreated water and the filter cartridge and secondary product container attached thereto.
FIG. 2b is a side view of the device hanging from a support with water flowing from the primary container through the filter cartridge and into the secondary product container.
Figures 5A, 5B:
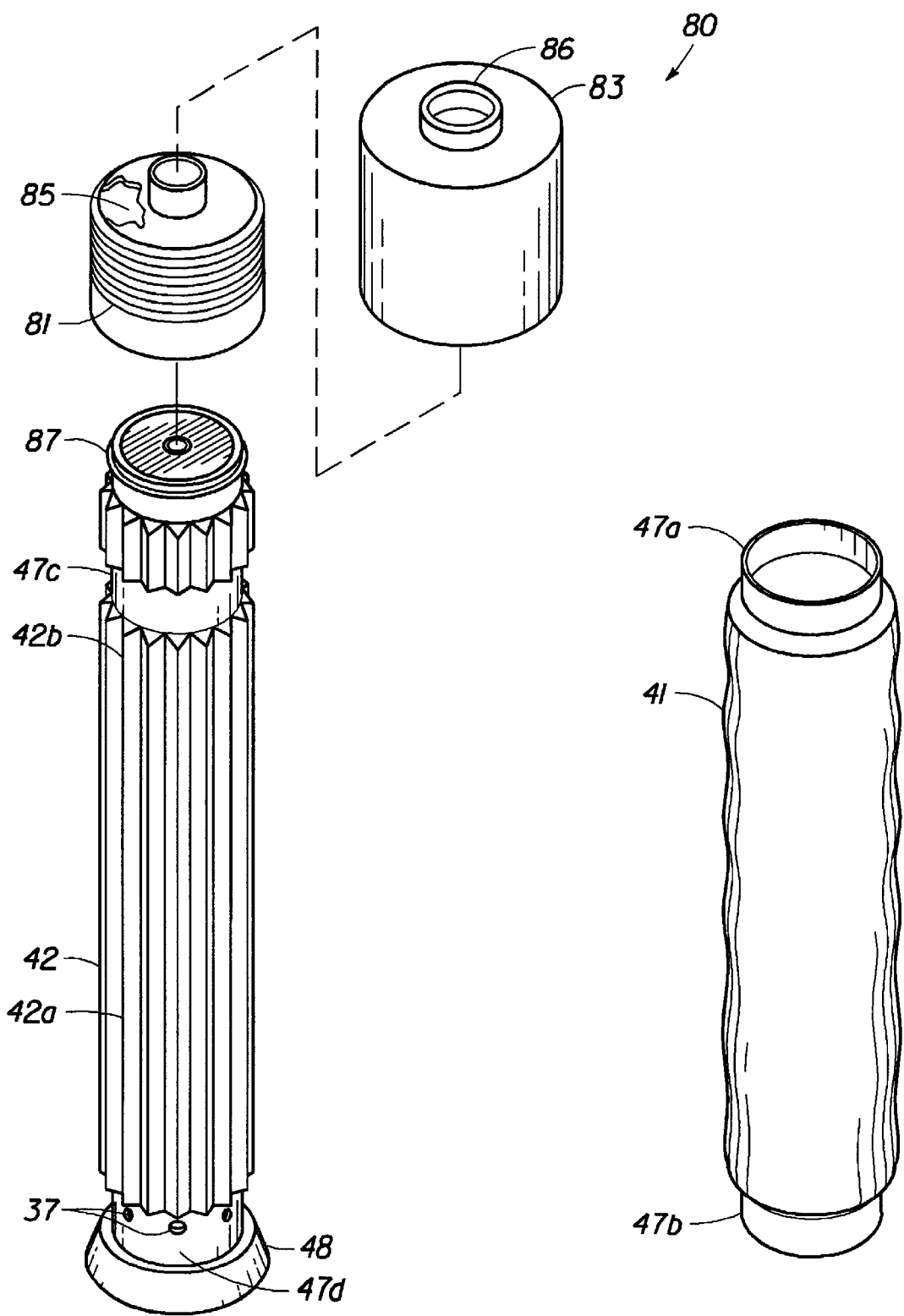

It can be seen from the following description that emergency water treatment device is useful for individuals who are traveling to locations which do not have safe drinking water. The device is easily carried and includes all elements necessary to purify non-potable water and store the purified water for use.

The main components of the device include a primary container 10, a filter cartridge 30, and a secondary container 50. The device is used by filling the primary container 10, containing disinfecting agent 15, with untreated water, installing the filter cartridge 30 on an inlet end of the primary container 10, shaking container 10 to speed disinfectant mixing, connecting the secondary container 50 to an outlet end of the filter cartridge 30 and then inverting the entire setup so that the untreated water enters the inlet port of the cartridge. After a disinfecting period controlled by the physiochemical means described herein lapses, the disinfected water is allowed to enter the filter cartridge 30 and flow into the secondary container 50. The primary container 10 is preferable a flexible plastic bag which can be tightly rolled for storage prior to use and disposal after use, as illustrated in FIGS. 8a–j. The primary container 10 also includes a connecting neck 11, which is designed to mate with and sealingly attach to the inlet end 35 of the filter cartridge 30. The connecting neck 11 preferably includes a female threaded portion 12 as illustrated in the FIGS. 1, 6 and 7a–b, or any other connecting means which would sealingly and permanently attach the filter cartridge inlet end 35 to the primary container 10, such as the snap connector 12a illustrated in FIG. 6. It is preferable that the primary container be permanently attached to the filter cartridge to prevent future use of the filter cartridge and avoid further bacteriological contamination. After filtration is completed, the primary container along with the attached filter cartridge, forming one piece, is safely discarded. Opposite from the connecting neck 11 of the primary container 10 is hanging loop 14 which is used to hang the primary container 10 from a support 13, the hanging loop 14 has an internal diameter large enough to accommodate numerous support options, such as doors knobs, tree branches, coat hangers, etceteras. The hanging loop 14 must also be strong enough to support the weight of the primary container 10 filled with water. The primary container 10 may also be pre-charged with a disinfecting agent 15, such as granulated or powdered effervescent grade of calcium hypochlorite which supplies chlorine at a concentration up to 20 parts per million to disinfect parasites, bacteria and other biological contaminants for a pre-determined disinfecting period of no less than 20 minutes to assure the disinfection of the untreated water is complete prior to filtering. The disinfecting agent 15 may also be supplied as a separate pre-packaged container with the device and added to the interior 16 of the primary container 10 either prior to or after adding untreated water to the primary container 10. A unidirectional bag insert 11a forming a plastic rosette in a closing position and acting as a check valve to prevent disinfecting agent granules from falling out of bag 10 when the filter is not in place, is illustrated in FIGS. 8b–h.

The secondary container 50 has a connecting neck 51, which is configured to mate with and sealingly connect to a female threaded outlet end attachment 45 of the filter cartridge 30. The secondary container connecting neck 51 preferably includes a male threaded portion 52, which is threadingly received by the female threaded portion 46 of the outlet end 45. The secondary container 50 may be provided releasably attached to the outlet end 45, so that the installation is not necessary, but removal is easily facilitated by the threaded connection. The different connecting neck arrangements for the primary and secondary containers assures that the containers will not be attached to the wrong end of the filter cartridge, which is necessary since the primary container 10 may be supplied pre-charged with highly soluble effervescent disinfecting agent 15, while the secondary container 50 is supplied with a cleaned interior for receiving the disinfected and filtered water. The secondary container 50 is also preferably a flexible plastic bag, which is easily stored and/or disposed. To maintain sterility of the secondary container 50, its inlet port 53 is fitted with a safety sealing film 54. This seal is punctured by the sharp tip of the outlet water axial tube 46 extending from the filter cartridge 30, by threadingly this container to the filter cartridge. The filter cartridge 30 comprises a primary external cylindrical housing 40, which is threadingly connected to the primary and secondary water containers 10 & 50. The housing 40 contains an inner close-ended coaxial secondary housing 42, which supports the pre-filtration element 41 and contains within its interior the other treatment media 43. The secondary housing 42 has a slightly tapered base 48, which rests sealingly on the lower end of the external housing 40 when the filter element is assembled. The treatment media 43 may include a mixture of activated charcoal 43a and anion ion exchange resin 43b or segregated layers of charcoal and anion ion exchange resin placed in the interior of the secondary housing. The secondary housing 42 has equally spaced longitudinal profiled ribs 42a around the circumference of the exterior, which support the pre-filter element 41 and form longitudinal water passageways 42b. The pre-filter element 41 is a cylindrical socket-like woven fiber or filter paper element placed on the profiled external surface of the secondary housing 42 while maintaining an annulus, thereof between the filter socket and the primary housing 40 for a water passageway 31 extending from circumferential series of ports 36 at the top end 35 of the external housing 40 to the outlet port 46. The pre-filter element 41 is secured at both ends 47a–b around the coaxial secondary housing 42 at profiled attachment surfaces 47c–d respectively to insure that untreated water flows only through the filter media. The profiled ribs 42a with water passageways 42b on the exterior of the secondary coaxial housing 42 are intended to enhance the flow of filtered water across the pre-filter media and provide minimum resistance for water to flow downwardly along the external wall of the secondary coaxial housing. Thereafter, filtered water passes through circumferential series of ports 37, which are located beneath the pre-filter media at the bottom of the said coaxial cylinder 42, and travels upwardly through the activated charcoal and ion exchange treatment media 43. At the top of the treatment media 43 resides a post treatment filter 44 of compacted fibrous material acting as a final filtration stage. Treated water passes through the post filter 44 into the axial water outlet tube 32 via multiple perforations 38 at the top of the said tube and into the secondary water container.

A physicochemical time switch 60 is positioned to sealingly bridge the gap between the inlet end 35 of external housing 40 and the secondary housing 42. The physicochemical time switch 60 provides a means for blocking the flow of water from the primary container 10 to the filter housing 40 until a disinfecting time period has lapsed thereby assuring that the untreated water is fully disinfected prior to filtering, about twenty to about twenty five minutes. The physicochemical time switch 60 functions to block the flow of water from the primary container 10 through the filter housing 40 for a period of time, coinciding with a disinfecting time period, which is the amount of time necessary for complete disinfection of the untreated water with the disinfecting agent. Two different physicochemical time switches 60 are disclosed which include a water dissolvable barrier time switch 70, and an expandable compartment time switch 80. FIGS. 1, 4, 5a, and 7a–b illustrate the expandable compartment time switch 80 while FIG. 6 illustrates the water dissolvable barrier time switch 70.

Figure 6:
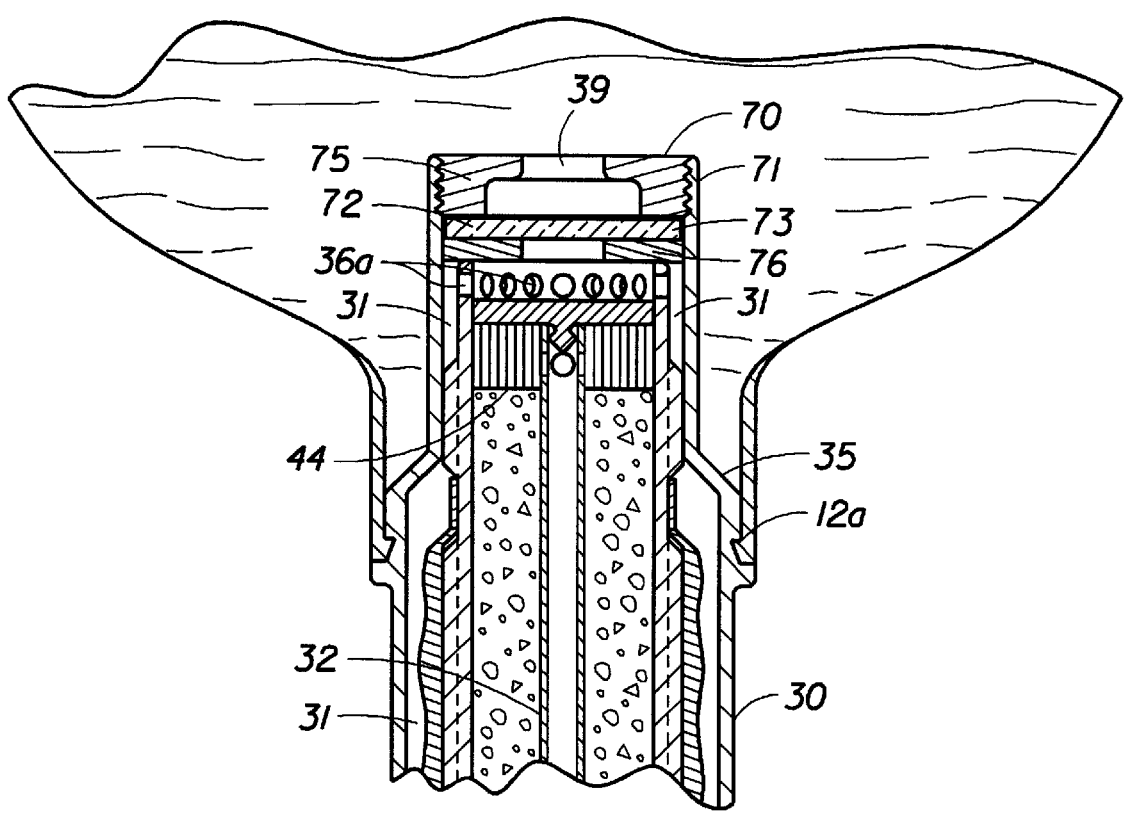
FIG. 6 is a cross section of an inlet end of the filter cartridge illustrating the gel membrane physicochemical time switch.

The water dissolvable time switch 70, illustrated in FIG. 6, includes a plastic housing 71 constructed integrally within the inlet end 35 of the cartridge 30 wherein the housing has a centrally located inlet port 39 which allows water to flow into contact with a water dissolvable barrier 72 sealingly secured about its perimeter 73 to the interior of the plastic housing 71 with spacer 76 and retained in its place with a threaded holder 75. When the primary container 10 is inverted and water flows into contact with the barrier 72, it begins to slowly dissolve and eventually breakup allowing water to flow past the barrier into the filter housing 40 of the cartridge 30. The time required for dissolving the barrier must be about equal to or exceed the disinfection period. Once the water travels past the dissolved barrier it travels through numerous circumferential apertures 36a at the top end of the cartridge 30 down the water passageway 31 and through the various filter elements and media as described above into the collection tube 32 and down to the outlet port 46. The water dissolvable barrier 72 is preferably constructed of non-hazardous material such as pectin, gelatin, various sugars, monosaccharides, disaccharides, and trisaccharides and or edible salts. The barrier may be form into either a disc, a film, membrane or a gel. The thickness of the film, gel, disc, or membrane will determine the time for dissolving the barrier which may be adjusted during manufacturing to assure the dissolve time about equals the disinfection period.

Figure 7A:
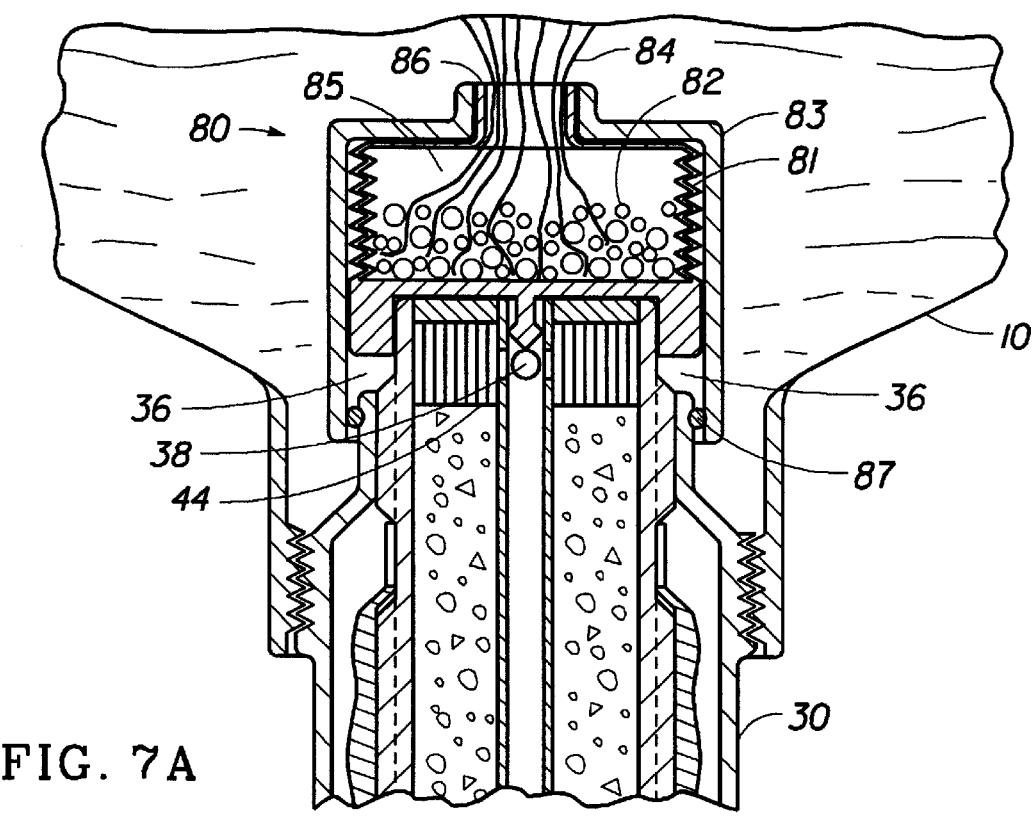
FIG. 7a is a cross section of an inlet end of the filter cartridge illustrating the expandable compartment physicochemical time switch in a closed position.
Figure 7B:
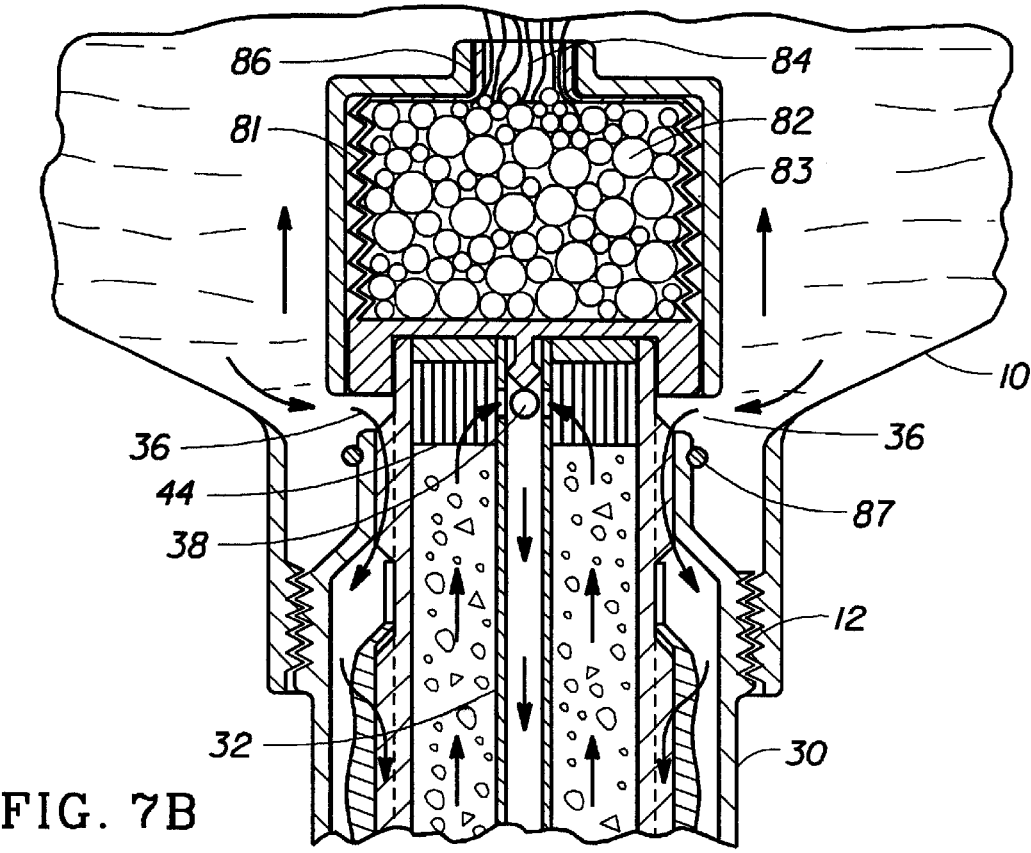
FIG. 7b is a cross section of an inlet end of the filter cartridge illustrating the expandable compartment physicochemical time switch in an open position.
Figure 8A:
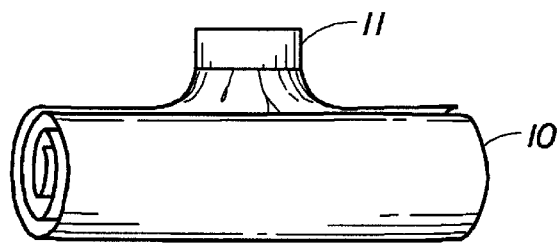
Figures 8B, 8C:
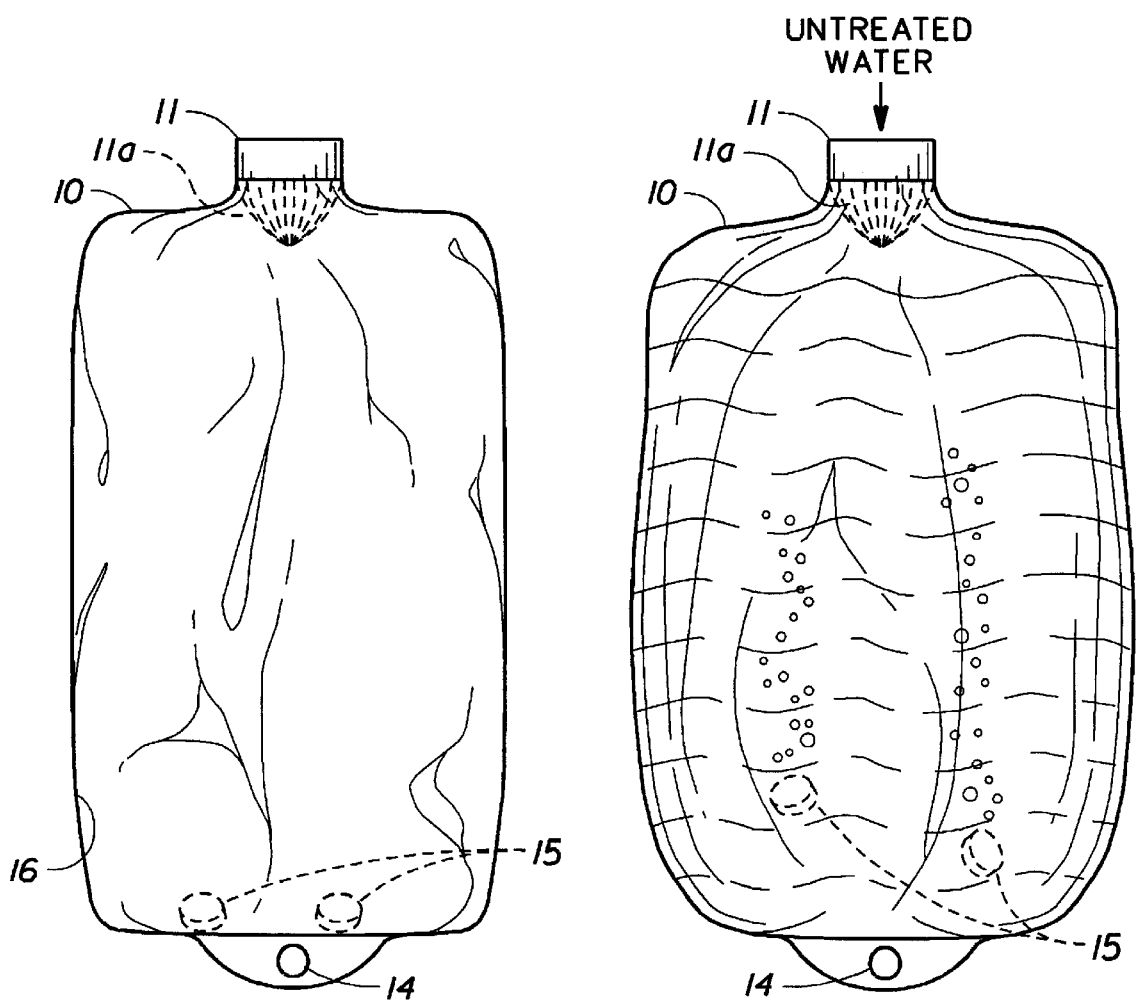
Figure 8D:
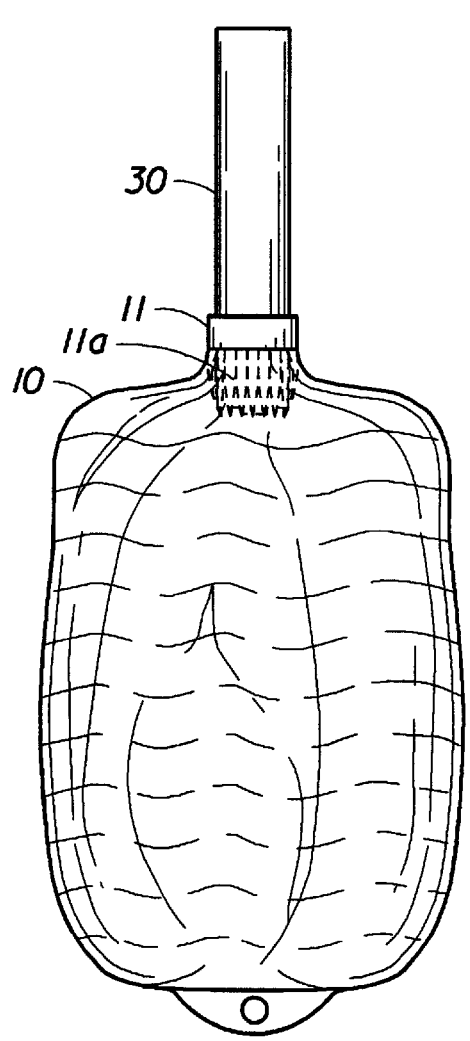
Figure 8E:
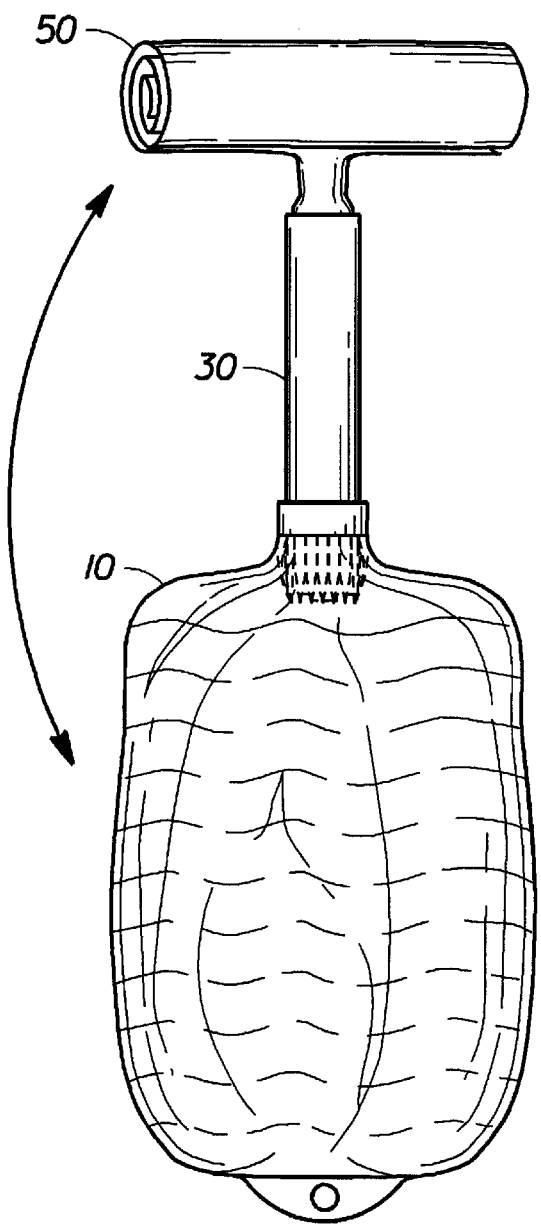

The expandable compartment time switch 80, illustrated in detail FIGS. 7a–b, is mounted to an inlet end 35 of the filter cartridge 30 and includes an expandable compartment 81 filled with hydrophilic compounds 82 which absorb water and swell when exposed to water. A longitudinally moveable cover 83 receives the expandable compartment 81 and fits snugly over the inlet end 35 of the filter cartridge 30. Capillaries 84 extend from an interior 85 of the expandable compartment 81 through a centrally located aperture 86 so that the capillaries 84 are both in contact with the hydrophilic compounds 82 and the water in the primary container thus providing a means for transporting water from the primary container into the interior 85 of the expandable compartment 81 and into contact with the hydrophilic compounds 82 to facilitate swelling of the hydrophilic compounds 82 and expansion of the compartment 81 and movement of the cover 83 from a closed position covering the inlet port 36 and blocking the flow of water into the filter elements 40, to an open position allowing the flow of water from the primary container into the inlet port 36 and the filter elements 40. FIG. 7a illustrates the expandable compartment time switch in a closed position while FIG. 7b illustrates the time switch moved to an open position. The moveable cover 83 includes an O-ring seal 87 positioned around its interior perimeter and in sealing contact with the inlet end of the cartridge to prevent intrusion of untreated water past the cover prior to hydration of hydrophilic compounds and expansion of the expandable compartment. The capillaries 84 preferable provide high capillary flow and are composed of cellulose cotton wick material or water absorbing paper. The hydrophilic compounds are preferable super absorber polymers such as polyacrylamides, which can absorb from 300–400 times their weight in water while also swelling from a rock salt size to about ¼ to ½ inch in diameter. The swelling provides the physical movement necessary for operation of this time switch, while the amount of the hydrophilic compound, volume of the expandable compartment, and size of the hydrophilic compound may be varied to affect the time necessary for the expandable compartment and cover to move from a closed position to an open position, which can accordingly be adjusted to coincide with the disinfecting period.

Figure 9B:
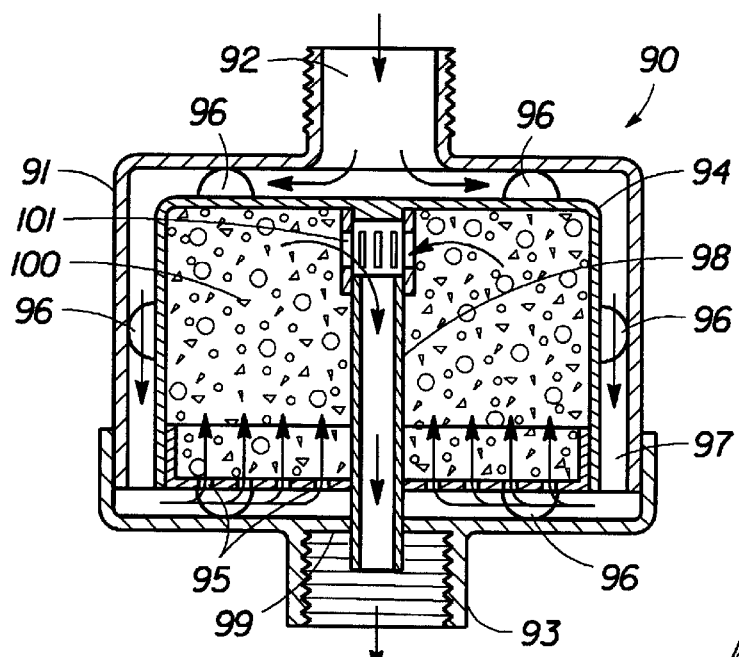
FIG. 9b is an elevation section of an ion exchange canister used in FIG. 9A, specifically designed in conjunction with the subject invention, showing water flow pattern
Figure 9A:
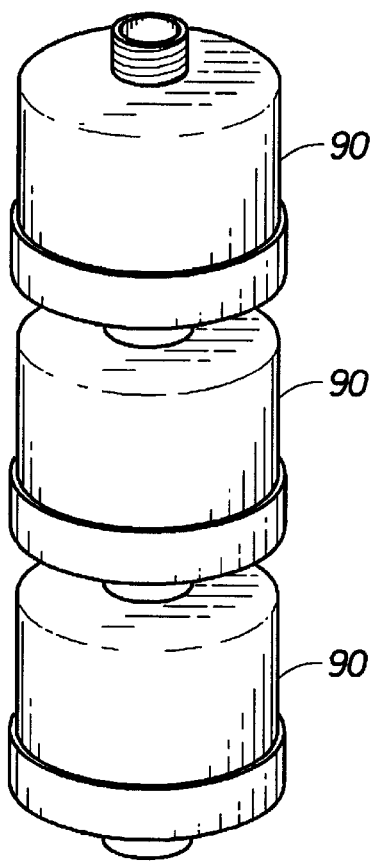
FIG. 9A is an illustration a multi-canister of mixed ion exchange resin forming a cascade for treatment of saline water, where the number of canisters in the cascade depends on the degree of salinity.
Figure 9C:
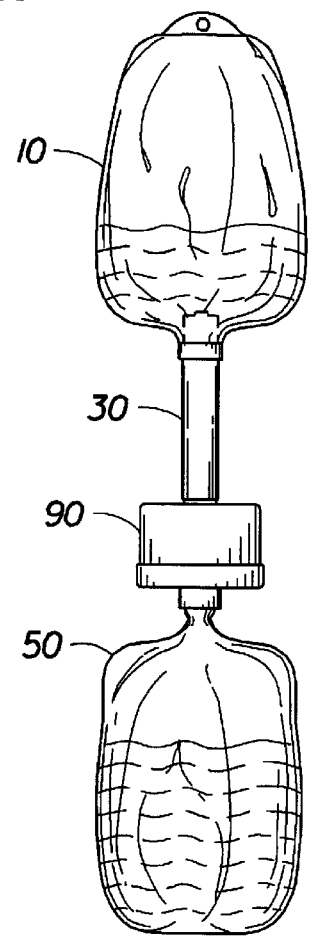
FIG. 9C is an illustration of the emergency device of FIG. 1 with an ion exchange canister positioned between the primary and secondary containers for a secondary treatment of brackish water wherein the canister contains a mixed cation and anion ion exchange resin.

The emergency water device of the subject invention could be modified to remove specific water contaminant or suitable for specific application. For example, when brackish or seawater is the only source of water supply, the filter cartridge 30 could be used as a primary treatment module, followed by a mixed cation and anion ion exchange canister 90 of comparable configuration to eliminate or reduce water salinity. FIGS. 9a, b and c depicts the design of such device. The ion exchange canister 90 comprises an outer housing 91 with a male threaded inlet port 92 to engage the female thread 45 of the filter element 30, and a female threaded outlet port 93 to engage the inlet port of a subsequent canister or the port of purified water container 50. A coaxial cylindrical container 94 is placed within the canister housing 91 and contains a mixture of cation and anion ion exchange resin 100 generated in the form of hydrogen and hydroxyl respectively. The resin container 94 is a closed plastic can-like vessel having a perforated bottom 95 with holes small enough to retain resins within the container. An annulus flow path 97 is maintained between the resin container 94 and the internal surface of the canister housing 91 by means of projected members 96 extending from the external surface of container 94. An axial tube 98 extends through the resin container 94 to transport purified water to the subsequent treatment canister or storage container. The inlet end of the tube 98 is shrouded with a resin retainer filter media 101, while its lower end is sealingly and securely attached by means of plate 99 to the outlet port 93 of canister housing 91. In service mode, water flows downwardly from the prior treatment module through the annulus space 97, thereafter, via the bottom perforation of resin container 94 and upwardly through the mixed resin bed 100 and downwardly through the axial tube 98.

Canisters are preferably cylindrical containers of about 4 inches in diameter by 4 inches in height. Each canister contains enough resin to remove dissolved solids from one gallon of untreated water having a concentration of less than 10,000 parts per million. For higher dissolved solids concentration, a cascade of ion exchange canisters, as illustrated in FIG. 9*a*, would be connected in series to achieve the desired requirements.

Figure 10:
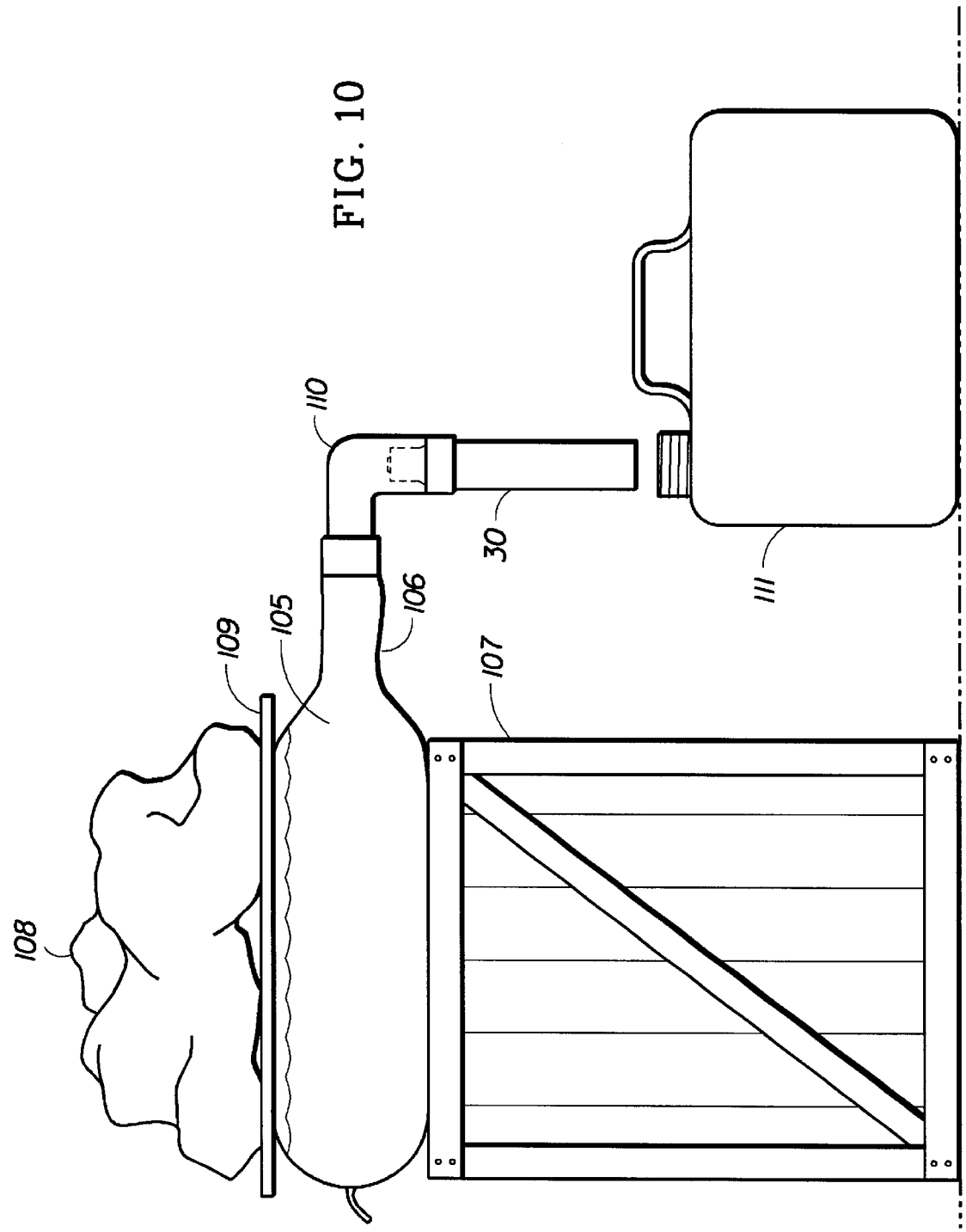
FIG. 10 is an illustration of a scaled-up version of the emergency device having a volume of about three gallons, while the primary bag, due to its weight, is placed horizontally on a conveniently elevated structure such as a wooden log or a rock. The primary bag is subjected to a light external weight to enhance water flow. Treated water is collected in a portable rigid container of suitable size.

The containers may be scaled up to accommodate larger volume water purification as illustrated in FIG. 10, and may be increased to about 3 to 5 gallons. In such case the filter must also be enlarged to accommodate the increased volume of water. In this case, the raw water bag 105 due to its relatively heavy weight, is placed horizontally on a conveniently elevated structure 107 such as a wooden log or a rock. The raw water bag is subjected to a light external weight 108 such as a rock to enhance water flow. The weight 108 is preferably placed over a board 109 to distribute the pressure and prevent puncturing the water bag. A large water container of such size is better fitted with an elongated neck 106 to facilitate holding the bag in a vertical position during filling with raw water. Filter 30 is operated best in a vertical position, therefore an attachment 110 forming an L shape is provided to attach the filter to the outlet of the horizontally placed untreated water bag. Treated water in such application is conveyed directly to a portable rigid container 111 of suitable size.

It is noted that the embodiment of the Emergency Water Treatment Device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What I claim is:

1. An emergency water treatment device, comprising:
   a) a primary container for receiving untreated water, and a disinfecting agent contained therein,
   b) a secondary container for receiving treated and filtered water,
   c) a filter cartridge with a filter element contained therein with the cartridge positioned between the primary and secondary container which filters the water flowing from the primary container to the secondary container,
   d) a physicochemical time switch which blocks the flow of water from the primary container to the filter element for a period of time which coincides with a disinfecting period wherein the disinfecting period is a time period for disinfecting the untreated water within the primary container with the disinfecting agent.

2. The emergency water treatment device of claim 1, wherein each container further comprises: a plastic bag each with a neck opening dimension to be attached to the filter cartridge.

3. The emergency water treatment device of claim 1, wherein the filter cartridge further comprises: an inlet port attached to the primary container and an outlet port attached to the secondary container, numerous filter stages including pre and post filter mesh, activated charcoal and anion ion exchange resins, water passageways extending from the inlet port to the filter stages, and wherein the physicochemical time switch is positioned in the water passageway to prevent the flow of untreated water there through until the disinfecting time period has lapsed.

4. The emergency water treatment device of claim 1 wherein the physicochemical time switch further comprises: a water dissolvable barrier which dissolves upon contact with water from the primary container over a period of time which coincides with the disinfecting time period.

5. The emergency water treatment device of claim 4 wherein the water dissolvable barrier further comprises: a water dissolvable film composed of one or more compounds selected from a group consisting of: gelatin, and pectin.

6. The emergency water treatment device of claim 4 wherein the water dissolvable barrier further comprises: a water dissolvable disc composed of one or more compounds selected from a group consisting of: monosaccharides, disaccharides, trisaccharides, and edible salts.

7. The emergency water treatment device of claim 1 wherein the physicochemical time switch further comprises: an expandable compartment with an interior filled with a hydrophilic compound, capillaries extending from the interior of the expandable container to a location in contact with the water in the primary container which, over a time period coinciding with the disinfecting time period, transports water into the interior of the compartment into contact with the hydrophilic compounds thereby causing the hydrophilic compounds to swell and expand the expandable compartment, thereby moving the expandable compartment from a position blocking the flow of water from the primary container to the filter element to a position allowing the flow of water from the primary container to the filter element.

8. The emergency water treatment device of claim 7 wherein the hydrophilic compound further comprises polyacrylamide.

9. The emergency water treatment device of claim 7 wherein the capillaries further comprise: numerous capillary fibers composed of material selected from a group consisting of: cellulose cotton wick, and water absorbing paper.

10. The emergency water treatment device of claim 1 further comprising a mixed cation and anion ion exchange canister positioned between the cylindrical filter cartridge and the secondary water container for removing salts from brackish water, wherein the cylindrical filter cartridge serves as a pretreatment prior to desalination.

11. The emergency water treatment device of claim 10 wherein the ion exchange canister further comprises numerous canisters aligned in series providing a cascade removal of salts from the brackish water.

12. An emergency water treatment device comprising:
   a) a cylindrical filter cartridge with an inlet port at one end and an outlet port on an opposing end, filter stages contained within the filter cartridge for filtering water flowing from the inlet port to the outlet port,
   b) a primary water container for receiving a volume of non potable water, the container has a neck opening for filling the container and which is dimensioned to sealingly connect to the inlet port of the filter cartridge,
   c) a disinfecting agent added to the volume of non potable water in the primary container for a disinfecting time period to disinfect the water prior to the water flowing into the filtering stages of the filter cartridge,
   d) a secondary container for receiving a volume of treated water, the secondary container has a neck dimensioned to sealingly connect to the outlet port of the filter cartridge, and
   e) a physicochemical time switch contained within the cylindrical filter cartridge and positioned between the inlet port and filtering stages contained within the filter cartridge, the time switch includes a means for blocking the flow of water from the primary container to the filtering stages until the disinfecting time period has lapsed.

13. The emergency water treatment device of claim 12, wherein the physicochemical time switch further comprises a water dissolvable barrier positioned within the filter cartridge and blocking the flow of water from the inlet port to the filter stages of the filter cartridge for a period of time which coincides with the disinfecting time period.

14. The emergency water treatment device of claim 12, wherein the physicochemical time switch further comprises a water passageway extending from the inlet port to the filter stages, an expandable compartment positioned to block the water passageway and prevent the flow of water there through, hydrophilic expandable compounds contained within an interior of the expandable compartment, capillary fibers extending from the inlet port to the interior of the expandable compartment and positioned adjacent to the hydrophilic compounds providing a means for transporting water from the inlet port into contact with the hydrophilic compounds thereby causing the hydrophilic compounds to swell and thereby expand the expandable compartment and open the water passageway after a given period of time which coincides with the disinfecting period, allowing water to flow through the filter stages.

15. The emergency water treatment device of claim 14 wherein the water dissolvable barrier is either a film, gel membrane or disc, composed of a compound selected from a group consisting of: edible salts, monosaccharides, disaccharides, trisaccharides, pectin, and gelatin.

16. The emergency water treatment device of claim 14 wherein the hydrophilic expandable compound further comprises polyacrylamide.

* * * * *